(12) United States Patent
Maryfield et al.

(10) Patent No.: US 10,146,974 B2
(45) Date of Patent: Dec. 4, 2018

(54) OPTICAL SCANNING FOR LINE-OF-SIGHT COMMUNICATIONS TO OPTICAL TAGS

(71) Applicant: Cubic Corporation, San Diego, CA (US)

(72) Inventors: Tony Maryfield, Poway, CA (US); Jonathan R. O'Brien, Poway, CA (US)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 15/782,589

(22) Filed: Oct. 12, 2017

(65) Prior Publication Data

US 2018/0101707 A1    Apr. 12, 2018

Related U.S. Application Data

(60) Provisional application No. 62/407,353, filed on Oct. 12, 2016.

(51) Int. Cl.
*G01S 17/74* (2006.01)
*G06K 7/10* (2006.01)
(Continued)

(52) U.S. Cl.
CPC .......... *G06K 7/10801* (2013.01); *F41A 17/08* (2013.01); *F41G 1/35* (2013.01); *G01S 17/74* (2013.01); *G02B 26/0833* (2013.01); *G02B 26/10* (2013.01); *G06K 7/10128* (2013.01); *G06K 7/10376* (2013.01); *G06K 7/10584* (2013.01); *G06K 7/10603* (2013.01); *H04B 10/1123* (2013.01); *F41G 3/165* (2013.01); *G06K 7/10554* (2013.01); *G06K 2007/10495* (2013.01)

(58) Field of Classification Search
CPC ........ G01S 17/74; G01S 7/481; G01S 17/023; G01S 17/06; G01S 17/66
See application file for complete search history.

(56) References Cited

U.S. PATENT DOCUMENTS 3,954,228 A    5/1976  Davis
4,731,879 A    3/1988  Sepp et al.
(Continued)

FOREIGN PATENT DOCUMENTS

DE        2846562 A1    11/1976
EP        0653723 A3     2/2000
WO     2008/051714 A1    5/2008

OTHER PUBLICATIONS

International Search Report and Written Opinion dated Jan. 19, 2018 for PCT/US2017/056360; all pages.

*Primary Examiner* — Christopher Stanford
(74) *Attorney, Agent, or Firm* — Kilpatrick Townsend & Stockton, LLP

(57) ABSTRACT

An optical communication device can address these and other issues by utilizing a system and method in which an optical device emits a series of laser pulses that trace a spiral path over a coverage area. Each laser pulse containing a packet of information modulated at a relatively rate to help mitigate adverse effects from device movements, scintillation, and the like. The beam width of the laser, speed of the scan (along the spiral path), and number of laser pulses can be configured such that corresponding response pulses (e.g., retro-modulated pulses) received from an illuminated tag within the coverage may have a variety of different amplitudes, increasing the likelihood that at least one of the response pulses will have power characteristics that facilitate a proper decoding of the response pulse.

18 Claims, 6 Drawing Sheets

(51) Int. Cl.
*G02B 26/08* (2006.01)
*G02B 26/10* (2006.01)
*F41A 17/08* (2006.01)
*F41G 1/35* (2006.01)
*H04B 10/112* (2013.01)
*F41G 3/16* (2006.01)

(56) References Cited

U.S. PATENT DOCUMENTS

| | | | | |
|---|---|---|---|---|
| 4,995,101 | A * | 2/1991 | Titterton | H04B 10/11 |
| | | | | 342/45 |
| 5,038,406 | A * | 8/1991 | Titterton | H04B 10/11 |
| | | | | 342/45 |
| 2006/0018661 | A1 * | 1/2006 | Green | H04B 10/1127 |
| | | | | 398/128 |
| 2006/0232761 | A1 * | 10/2006 | McConville | F42B 12/42 |
| | | | | 356/5.1 |
| 2012/0001734 | A1 * | 1/2012 | Gerber | H04B 10/1143 |
| | | | | 340/10.1 |
| 2012/0050714 | A1 * | 3/2012 | McConville | F41A 33/02 |
| | | | | 356/4.01 |
| 2012/0189312 | A1 | 7/2012 | Maryfield et al. | |
| 2015/0049329 | A1 * | 2/2015 | Bridges | G01B 21/047 |
| | | | | 356/51 |
| 2015/0301174 | A1 * | 10/2015 | Hellickson | G01S 17/023 |
| | | | | 348/47 |
| 2016/0285551 | A1 | 9/2016 | Mateti et al. | |

* cited by examiner

OPTICAL SCANNING FOR LINE-OF-SIGHT COMMUNICATIONS TO OPTICAL TAGS

CROSS-REFERENCES TO RELATED APPLICATIONS

The present application claims benefit under 35 USC 119(e) of U.S. Provisional Application No. 62/407,353, filed on Oct. 12, 2016, entitled "Optical Open Loop Area Scanning Technique for Optimal Handheld Line of Sight Communications to Optical Tags," which is incorporated by reference herein in its entirety.

BACKGROUND

Laser communication between optical devices (e.g., handheld scopes, weapon-mounted scopes, etc.) and receiver devices (or "tags") can be utilized in a variety of military or other applications. Such communication can, for example, be used for identification, such as Identification, Friend or Foe (IFF) systems. In many laser communication systems, the optical device can be equipped with an interrogator unit that transmits a laser signal to a tag, which can reflect and modulate the laser signal with a predetermined message (e.g., code of the day (CoD)) for identification and/or authorization purposes. Laser communication systems can communicate additional or alternative information as well.

These optical devices are not without limitations. For portable optical devices, such as weapon-mounted optical devices, an optical device may suffer from any combination of poor battery life, an impractically short range, small coverage area, expensive components, etc., as well as effects due to atmospheric scintillation, human tremor, and the like.

BRIEF SUMMARY

An optical communication device can address these and other issues by utilizing a system and method in which an optical device emits a series of laser pulses that trace a spiral path over a coverage area. Each laser pulse containing a packet of information modulated at a relatively rate to help mitigate adverse effects from device movements, scintillation, and the like. The beam width of the laser, speed of the scan (along the spiral path), and number of laser pulses can be configured such that corresponding response pulses (e.g., retro-modulated pulses) received from an illuminated tag within the coverage may have a variety of different amplitudes, increasing the likelihood that at least one of the response pulses will have power characteristics that facilitate a proper decoding of the response pulse.

An example optical device, according to the description, comprises a laser, a laser-steering unit configured to direct laser light generated by the laser, a receiver unit, and a processing unit communicatively coupled with the laser, laser-steering unit, and receiver unit. The processing unit is configured to cause the laser to generate a plurality of pulses of laser light during a scanning process, cause the laser steering unit to direct the plurality of pulses of laser light along a spiral path during the scanning process, and for each of one or more pulses of received laser light detected with the receiver unit corresponding to respective one or more pulses of the plurality of pulses of laser light, determine whether the pulse of received laser light has been modulated to include predetermined information.

Embodiments of the optical device may comprise one or more the following features. The laser, the laser-steering unit, the receiver unit, and the processing unit may be at least partially housed in a mountable body configured to be mounted to another apparatus. The processing unit may be configured to cause the laser to generate the plurality of pulses of laser light over of a period of time, where a length of time each pulse of the plurality of pulses is generated is $1/1000$ the length of the period of time or less. The length of the period of time may be 1 s or less, and the length of time each pulse of the plurality of pulses is generated may be 100 μs or less. The processing unit may be configured to cause the laser to modulate each pulse of the plurality of pulses of laser light with data. The processing unit may be configured to cause the laser to modulate each pulse of the plurality of pulses of laser light at a data rate of at least 1 MHz, the processing unit may be configured to cause the laser to generate the plurality of pulses of laser light during the scanning process and cause the laser steering unit to direct the plurality of pulses of laser light along a spiral path during the scanning process such that, within a coverage area scanned during the scanning process, each area illuminated by a respective pulse of the plurality of pulses overlaps with at least one or more other areas illuminated by respective one or more other pulses of the plurality pulses. An area illuminated by one pulse of the plurality of pulses may overlap with at least 20 other areas illuminated by respective 20 other pulses of the plurality of pulses. The processing unit may be configured to cause the laser steering unit to direct the plurality of pulses of laser light such that a coverage area scanned during the scanning process is at least 5 milliradians (mrad). The laser-steering unit may comprise a microelectromechanical systems (MEMS) mirror. The laser may comprise a laser diode.

An example method of optical laser communication, according to the description, comprises generating a plurality of pulses of laser light during a scanning process, directing the plurality of pulses of laser light along a spiral path during the scanning process, detecting one or more pulses of received laser light corresponding to respective one or more pulses of the plurality of pulses of laser light, and for each of the detected one or more pulses of received laser light, determining whether the pulse of received laser light has been modulated to include predetermined information.

Embodiments of the method of optical laser communication may comprise one or more the following features. The plurality of pulses of laser light may be generated over of a period of time, and a length of time each pulse of the plurality of pulses is generated may be $1/1000$ the length of the period of time or less. The length of the period of time may be 1 s or less, and the length of time each pulse of the plurality of pulses is generated is 100 μs or less. Generating the plurality of pulses of laser light may further comprise modulating each pulse of the plurality of pulses of laser light with data. The modulating may comprise modulating each pulse of the plurality of pulses of laser light at a data rate of at least 1 MHz. The generating the plurality of pulses of laser light during the scanning process and the directing the plurality of pulses of laser light along a spiral path during the scanning process may be such that, within a coverage area scanned during the scanning process, each area illuminated by a respective pulse of the plurality of pulses overlaps with at least one or more other areas illuminated by respective one or more other pulses of the plurality pulses. The directing the plurality of pulses of laser light may comprise directing the plurality of pulses of laser light such that a coverage area scanned during the scanning process is at least 5 milliradians (mrad). The directing the plurality of pulses of laser light may comprise using a microelectromechanical systems (MEMS) mirror to direct the plurality of pulses of laser light. The generating the plurality of pulses of laser light may comprise using a laser diode.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

As provided herein, and broadly speaking, a "scanning process" is a process during which an optical device scans an area ("coverage area") by illuminating the area with one or more pulses of laser light. As described herein, a single pulse of laser light may illuminate only a portion of the area, in which case a plurality of pulses of laser light may be directed at different portions of the area, enabling the entire coverage area to be scanned (illuminated at least once) during the scanning process.

Additionally, although embodiments herein describe a tag has retro-modulating a laser pulse (e.g., a corner-cube retroreflector retro-reflecting and modulating a laser pulse transmitted by an interrogator unit of an optical device), embodiments are not so limited. Techniques herein may potentially utilize other types of tags, including tags that modulate in a different manner (e.g., other than amplitude modulation (AM)) and/or other types of tags (e.g., tags that may generate their own optical signal that is returned to the optical device).

Additionally, as used herein, the term "spiral path" refers a helical or circular path along which laser light is directed during the scanning process. It can be noted that a laser steering unit may operate to direct light along a spiral path, although pulses of laser light, rather than a continuous beam, may be used. In such instances, the laser light may not trace out the spiral path, but portions of the spiral path will be eliminated when the pulses are emitted. Additional details are provided herein.

Figure 1:
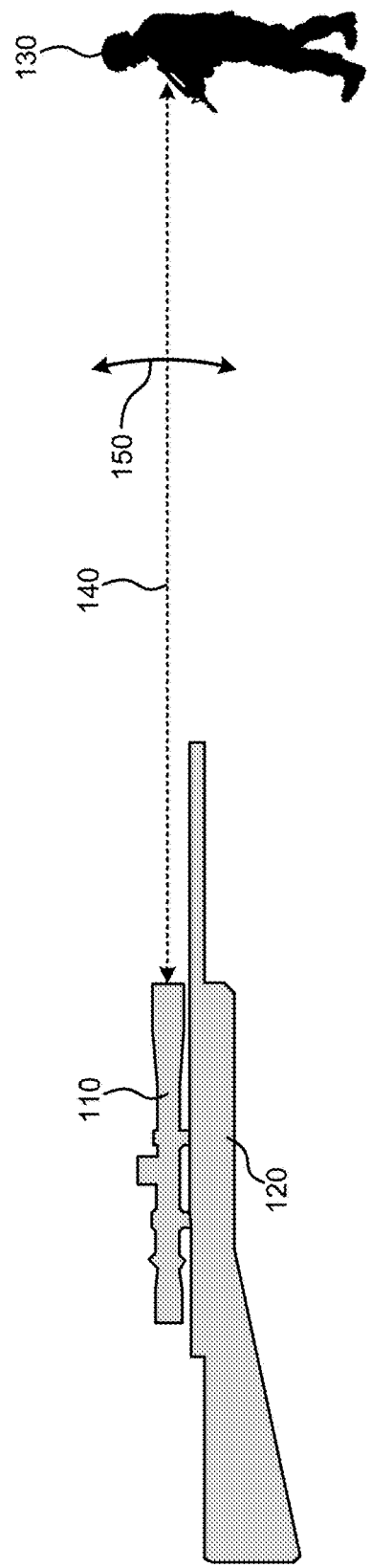
FIG. 1 is a simplified illustration of an example optical communication system, according to an embodiment.

FIG. 1 is a simplified illustration of an example optical communication system, according to an embodiment. In this example configuration an optical device 110 is mounted on a weapon 120 is used to illuminate a receiver device, or "tag," on a target 130. It will be understood, however, that optical devices may be utilized in other types of configurations and applications.

The optical device 110 may comprise an optical scope or other device mounted on the weapon 120, which may be aligned ("bore sighted") the weapon's firing trajectory. In such a configuration, a soldier may use the optical device 110 to generate an optical interrogation signal that travels along a path 140 and illuminates a tag (not shown) of a target 130, to determine, for example, whether to engage the target 130. The optical interrogation signal (typically a modulated laser pulse), will ideally illuminate a tag on the target 130, which will reflect and further modulate the optical pulse with information to identify or authenticate the target. In some embodiments, the tag a comprise a retro reflector (e.g., a corner cube retroreflector) configured to authenticate information carried by the optical interrogation signal and further retro-reflect and modulate at least a portion of the optical interrogation signal, which, once retro-reflected, travels along the path 140 back toward the optical device 110. The optical device 110 receives the modulated signal and attempts to decode information encoded by the modulation. In IFF applications, if a predetermined code (e.g., code of the day (CoD)) is detected or the target 130 is otherwise identified, the optical device 110 may provide an indication that the predetermined code has been detected. In a weapon-mounted rifle scope where and IFF code has been detected on a return signal, for example, the weapon-mounted rifle scope may include an indication that the target 130 is a "friend" using an liquid crystal display (LCD), which may be viewable through a viewing scope of the optical device 110.

In implementation, this basic functionality may be complicated by any of a variety of factors. For example, the beam of the laser is typically narrow, so may be difficult for a human aiming the weapon 120 to do so reliably and accurately enough to illuminate a distant target 130. That is, lasers cannot be aimed reliably and maintained on a target for communications (e.g., combat ID verification) to take place due to hand tremor and the movement in engagement. Using optics to widen the width of the beam significantly reduces the operating range of the optical device 110 and/or requires a much stronger (and typically more expensive) laser to compensate for the decrease in optical signal amplitude due to beam widening. This can result in poor battery life and increased laser cost. Furthermore, even if the tag is successfully illuminated, atmospherics insulation can cause the amplitude of the reflected signal to vary significantly (e.g., around 25 dB), making it difficult to receive a return signal that can be reliably decoded by the optical device 110.

Techniques that acquire and track lasers may also provide unsatisfactory results. It can take time, for example, to locate a tag within a field of view of the optical device 110, and then track the tag once located (e.g., using closed loop feedback controls). The complexity and cost of the components to implement such a system may also make it unviable in a practical perspective.

The techniques discussed herein solve these and other issues by using a scanning technique by which a relatively large coverage area may be scanned by a laser having a relatively small width. The scan, which may be completed quickly (e.g., in less than one second), can take advantage of the Gaussian profile of the laser beam, oversampling the coverage area to ensure a tag within the coverage area is illuminated by a laser signal multiple times, resulting in reflected laser signals having varying amplitudes, increasing the likelihood that at least one reflected laser signal can be properly decoded. Moreover, the modulation of the laser signal (by both the optical device 110 and the tag) may be set at a relatively high rate at which adverse optical effects due to scintillation and hand tremor are significantly reduced. These and other features are described in more detail below.

Figure 2:
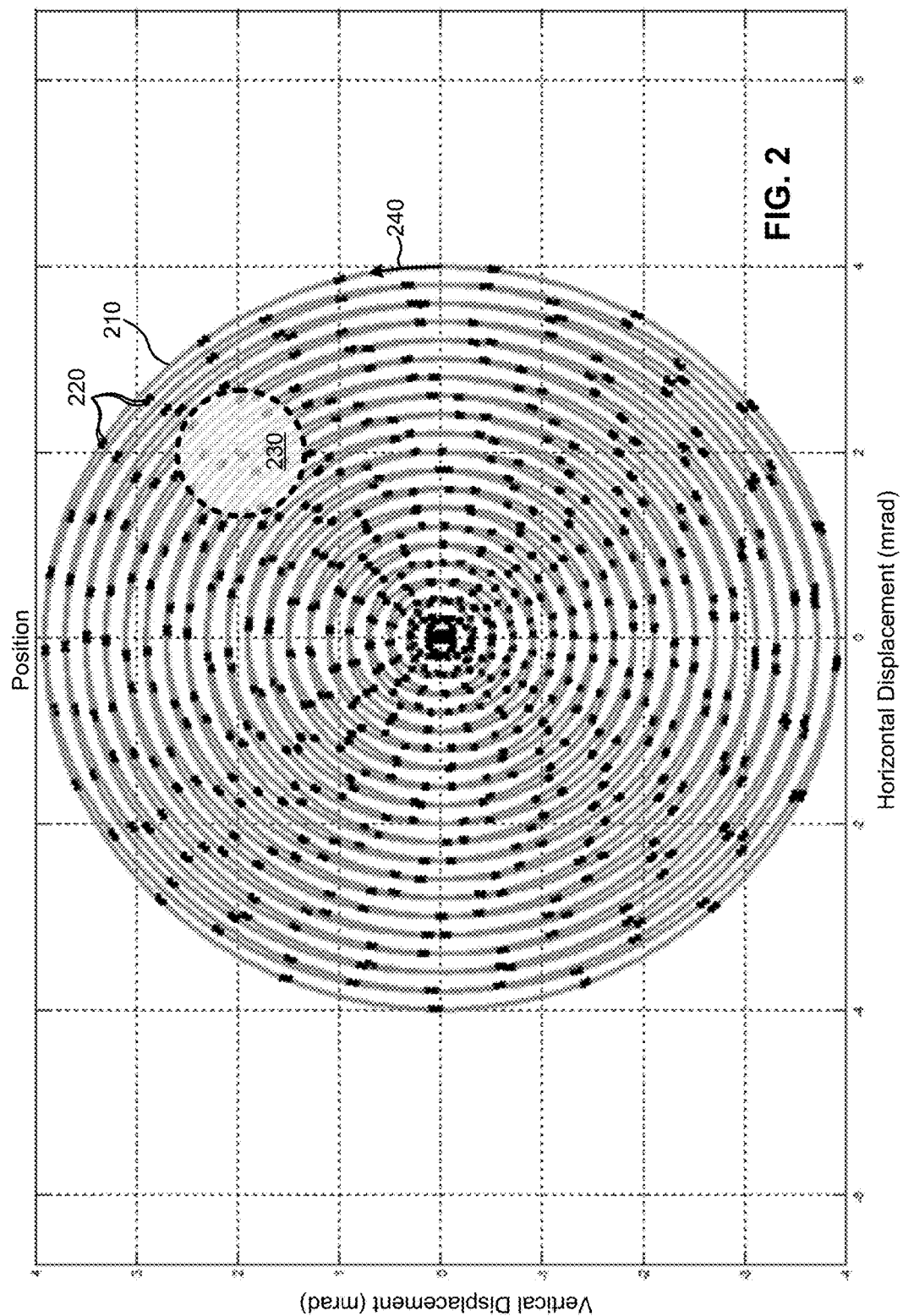
FIG. 2 is an illustration of a simulated scan pattern, showing vertical and horizontal displacement, according to an embodiment.

FIG. 2 is an illustration of a simulated scan pattern 210, showing vertical and horizontal displacement (in milliradians (mrad)), according to an embodiment. The scan pattern 210 is viewed from the perspective of the optical device, looking toward the target. As referred to herein, the term "coverage area" refers to the total area covered by the scan pattern 210. In FIG. 2, the pattern covers 8 mrad (±4 mrad vertical and ±4 mrad horizontal), although alternative embodiments may have a larger or smaller coverage area, depending on desired functionality. In fact, in some embodiments, this coverage area may be configurable, based on, for example, user settings.

Put generally, a laser a beam-steering unit (e.g., comprising a MEMS mirror) may direct laser light along a spiral route, spiraling inward from the perimeter of the scan pattern 210 to the center of the scan pattern 210, and/or vice versa. This may be performed a plurality of times in each scan, depending on desired functionality. In the simulated scan pattern 210 illustrated in FIG. 2, for example, the scan begins at the center of the scan pattern 210, spirals outward toward the perimeter of the scan pattern 210 and then spirals back inward to the center of the scan pattern 210. This process is performed twice during the course of a scan. According to some embodiments, the laser may not be on constantly, but may pulse at certain pulse locations 220 along the spiral route. (Pulse locations 220 are represented as black dots along the scan pattern 210. To avoid clutter, only a small portion of pulse locations 220 are labeled.) It will be understood, however, that alternative scan patterns may be performed, depending on desired functionality.

An advantage of scanning along a spiral (helical) pattern, such as scan pattern 210, is simplicity. It is generally easier to direct the laser beam along a spiral pattern in which angular velocity can be maintained, than, for example, a raster pattern, in which the beam steering unit may need to decelerate and accelerate at the end of each horizontal scan. This can further help ensure the scan takes place relatively quickly.

To be clear, pulse locations 220 are locations along the scan pattern 210, at which a laser pulse is transmitted by an interrogator unit of the optical device 110. Because each laser pulse can be very short in length, relative to the duration of the scan, it can be represented as a dot in FIG. 2. For example, in the simulation illustrated in FIG. 2, the simulated scan takes just under 700 ms. (Of course, alternative embodiments may have scans that take a longer or shorter amount of time.) In contrast, each laser pulse may be on the order of tens of microseconds (µs), depending on factors such as the amount of information in each pulse, bandwidth limitations of the interrogation unit of the optical device 110, and/or bandwidth limitations of the tag. In some embodiments, each laser pulse may communicate 64 bits of information at 1 MHz, resulting in a 64 µs pulse.) Of course, other embodiments may communicate a different amount of information, and/or communicate at a different rate.)

Although pulse locations 220 indicate locations along the scan pattern 210 at which the beam-steering unit of the optical device directs the laser during a laser pulse, the width of the laser may be larger, which can help ensure the laser eliminates the entire coverage area covered by the scan pattern 210. In FIG. 2, circle 230 represents the width of a laser beam (approximately 1 mrad). Thus, the process of the scan can be envisioned as a laser-steering unit tracing out the scan pattern 210 (e.g., along the lines of the scan pattern 210 in a counter-clockwise direction, as shown by arrow 240 (although a clockwise direction could also be used)), and every time the laser-steering unit is aimed at a dot representing a pulse location 220, a laser pulse is generated, illuminating a circle, the size of circle 230, centered at the pulse location 220. As can be seen, the scan pattern 210 and frequency of the pulses can ensure that multiple pulse locations 220 occur within any given area eliminated by the laser beam. This can result in "overscanning," which can help ensure at least one of the pulses as the proper power level to successfully decode information encoded on the reflected laser signal by the tag. This phenomenon is described in more detail in FIG. 3.

Figure 3:
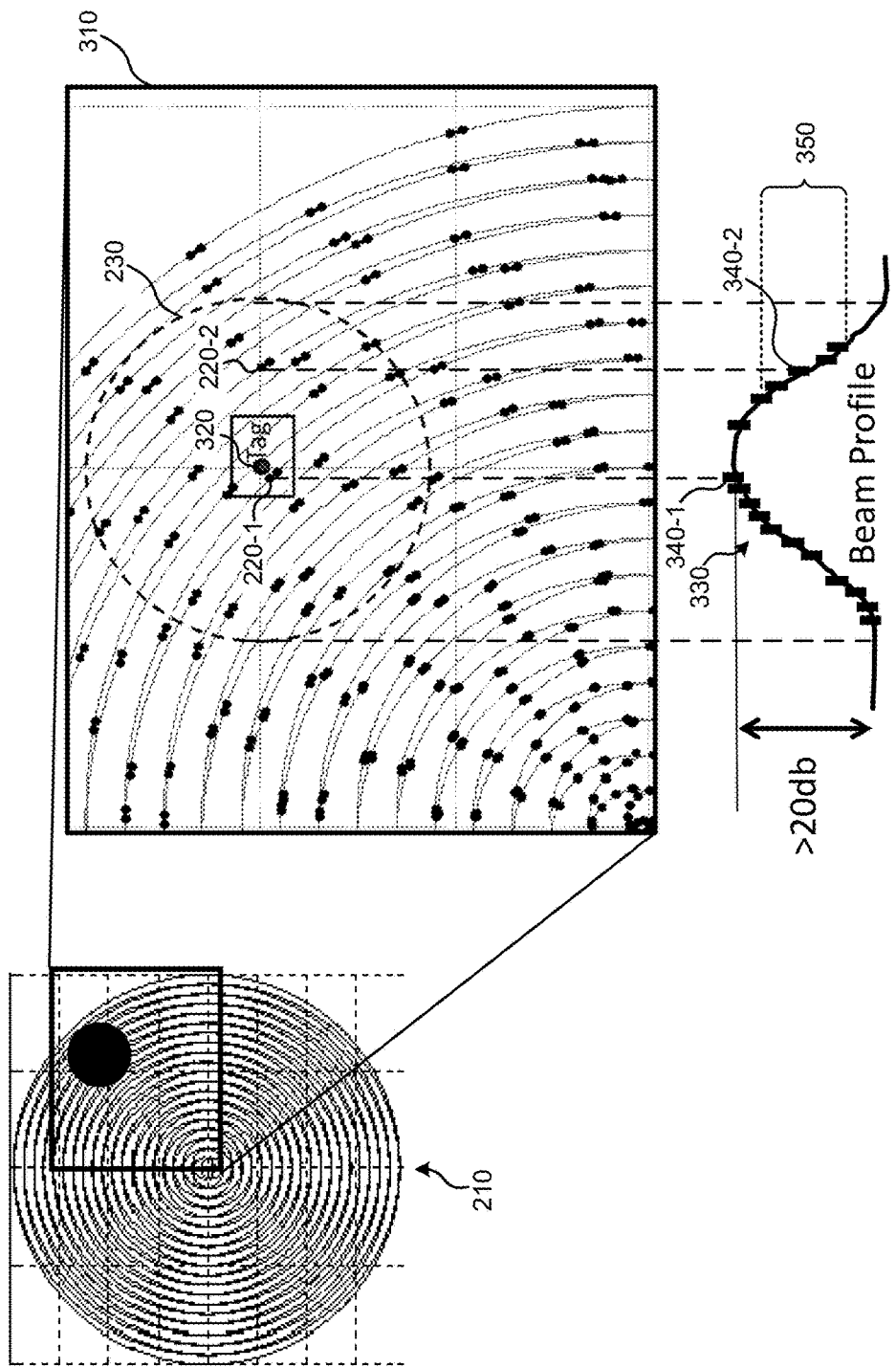
FIG. 3 is a close-up view of a portion of the scan pattern illustrated in FIG. 2, illustrating how the scanning technique illustrated in FIG. 2 can result in "overscanning," according to an embodiment.

FIG. 3 is a close-up view of a portion 310 of the scan pattern 210 illustrated in FIG. 2 having the circle 230, illustrating how the scanning technique illustrated in FIG. 2 can result in "overscanning" in which a tag within the coverage area of the scan pattern 210 may be scanned several times at several different power levels. Here again, as noted above, circle 230 corresponds to the width of the laser beam. Here, because the circle is centered on the tag 320, the circle 230 also represents an area within the scan pattern 210, where the tag 320 will be illuminated by the laser beam for each pulse location 220 within the circle 230. Because of the Gaussian power profile of the laser beam, the power of the signals reflected by the tag 320 will vary, depending on how close the tag 320 is to the pulse location 220.

The beam profile 330 illustrated at the bottom of FIG. 3 helps illustrate received power levels corresponding to laser pulses at each of the pulse locations 220 within the circle 230. For instance, for a first pulse location 220-1 located near the tag 320, a corresponding first power level 340-1 has a relatively high-power, near the peak of the beam profile 330. On the other hand, a second pulse location 220-2 located farther away from the tag 320 has a corresponding second power level 340-2 with a lower power. Here, the second power level 340-2 occurs within a linear dynamic range 350 of the Gaussian beam. Depending on the circumstance, reflected pulses having power levels above the linear dynamic range 350 may saturate the tag 320. Because the tag 320 may modulate the signal using amplitude modulation (AM), such saturation may prohibit modulation of the reflected return signal. And reflected pulses having power levels below the linear dynamic range 350 may be below a noise floor at which the reflected signal may not be accurately detected. That said, it will be understood that the noise floor and/or saturation level may not necessarily correlate with the linear dynamic range 350 in other instances. (If the tag 320 is relatively far away (e.g., 1 kilometer or more), a power level near the peak of the beam profile 330 may be preferable, whereas if the tag 320 is relatively near, a power level near the base of the beam profile 330 may be preferable.) It is the linear dynamic range 350 of the beam profile 330, however, that may provide the widest range of power levels. As indicated in FIG. 3, the variation in power levels of received signals corresponding to pulses of pulse locations 220 within the circle 230 can vary by more than 20 dB, due to the variation in power of the beam profile 330. (Of course, this variation may be greater or smaller than 20 dB, and other circumstances, and/or embodiments.) As such, it is likely that the optical device will receive a decodable signal that is neither saturated nor below a noise floor, even when the power in the signal can vary by up to 25 dB due to atmospheric scintillation. In some embodiments, for example, the scan pattern 210, laser beam width, and frequency of the pulses may be such that, for a given scan, a tag 320 located within the coverage area of the scan pattern 210 may be illuminated over 20 times during the course of the scan. (Of course, other embodiments may illuminate a tag a greater or smaller number of times, depending on desired functionality.) In this manner, the Gaussian beam shape provides a type of "pseudo dynamic laser power control" that facilitates optical communications to overcome nearly any type of adverse optical conditions.

As previously mentioned, each pulse may be modulated to include a packet of information sent from the optical device to the receiver. Depending on desired functionality, the structure of this packet may include a header, payload, and cyclic redundancy check (CRC). The payload can include information such as identification of the optical device 110 and/or other authentication information for the tag 322 authenticate. It may also include a series of pulses for retro-modulation by the tag 320, which the tag 320 may modulate to include the CoD and/or other information to be communicated back to the optical device 110.

During the pulse, the tag 320 can use a phase locked loop to bit synchronize, then bite synchronize, to decode the information packet sent by the optical device 110. The header of the information packet may help facilitate such synchronization, according to certain embodiments.

Because each laser pulse (and consequently, each data packet) can be relatively short (i.e., a "dwell rate" of the laser pulse on the tag is short relative to the scan rate), the power levels for the packet can be relatively uniform. That is, as noted above, changes in power do to the movement of the scan are relatively long compared with the pulse, as are power changes due to scintillation and hand tremor, which may occur on the order of hundreds of hertz or less. The packet, on the other hand, may be transmitted (and received) on the order of tens of microseconds. As such, the a receiver unit of the optical device 110 can set a threshold for bit detection based on maximum and minimum power levels of a received signal, because these power levels are unlikely to change much during the course of the receipt of the signal. (E.g., bits received having a power level over the bit detection threshold may be decoded as a "1", and bits received having a power level below the bit detection threshold may be decoded as a "0".)

Figure 4:
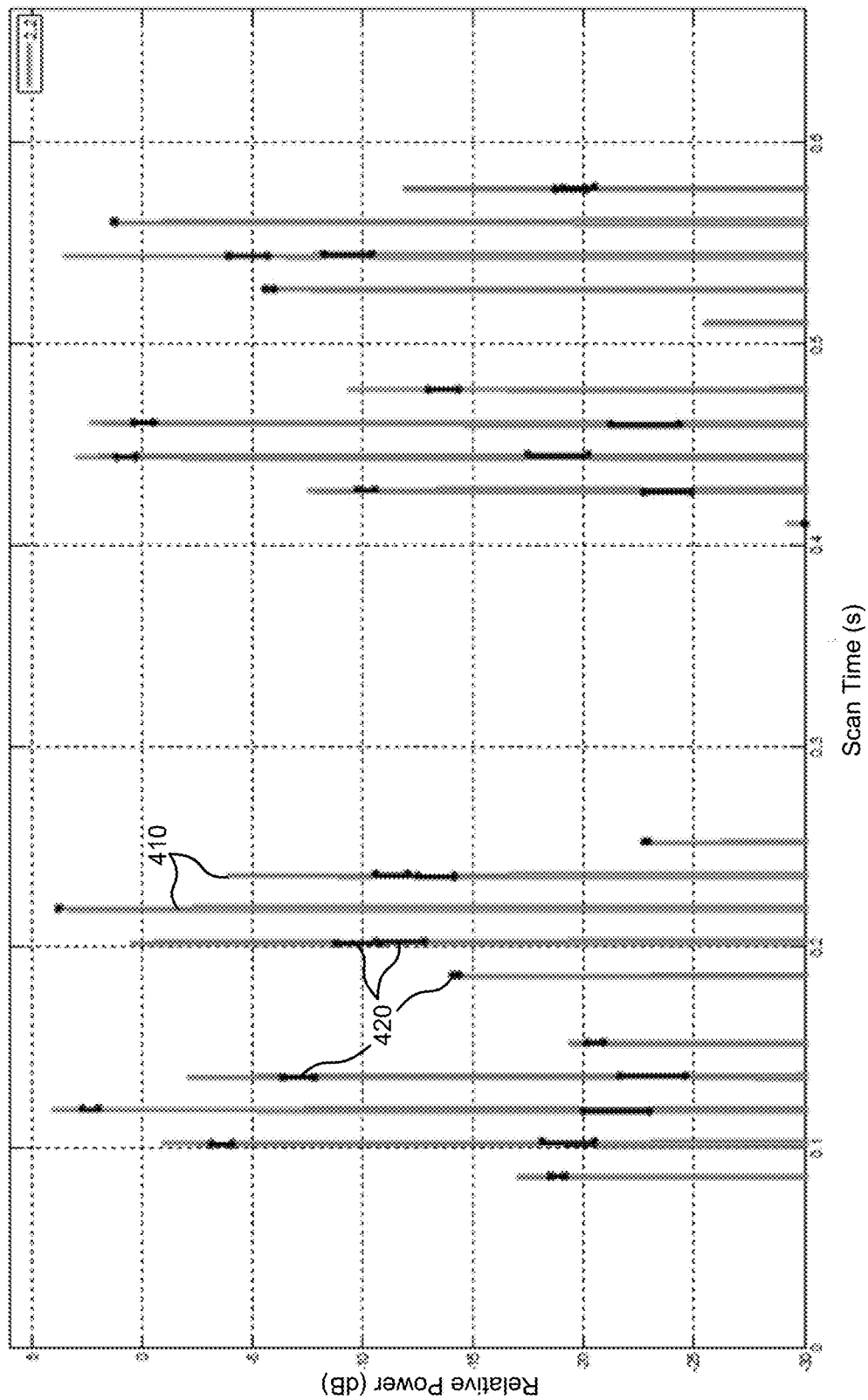
FIG. 4 is an illustration of simulated relative power levels, based on the same simulation as depicted in FIGS. 2-3.

FIG. 4 is an illustration of simulated relative power levels (Relative Power (dB) of reflected signals received by the optical device 110 (from tag 320) over the course of the scan (Scan Time (s)), based on the same simulation as depicted in FIGS. 2-3. Here, each spike 410 represents a time during which a portion of the scan pattern 210 is the circle 230 within which the tag 320 may be illuminated. (It can me noted that, to avoid clutter, not all spikes 410 are labeled.) The higher the relative power, the closer to the tag 320 the scan pattern 210 comes. Darker portions 420 of the spikes 410 represent laser pulses transmitted during those times. (Again, not all darker portions 420 are labeled.)

This figure further underscores the benefits of overscanning using the techniques provided herein. The periodicity of laser pulses can vary, depending on desired functionality. In the simulation illustrated in FIG. 4, the periodicity of the laser pulses is such that at least one pulse occurs while the scan pattern 210 is nearing the tag 320 (resulting in one or more darker portions 420 per spike 410), and laser pulses have a wide variety of relative power, ranging from approximately −30 dB to 4 dB over the period of a scan (roughly 650 ms).

According to some embodiments, the optical device 110 can stop the scan once a reflected laser pulse has been successfully decoded and determined to include desired information. For example, during the course of a scan, a receiver unit of the optical device 110 can attempt to decode each reflected laser pulse to determine whether it includes the predetermined CoD. If the pulses are too saturated or too weak to be successfully decoded, the scan can continue. However, because of the wide variation in the relative power of received laser pulses, it is likely that at least one of the received laser pulses has desirable power characteristics for proper decoding of information on the received laser pulse. Once the information has been properly decoded and the predetermined CoD has been detected, the optical device can stop the scan. This can help preserve time and power.

Figure 5:
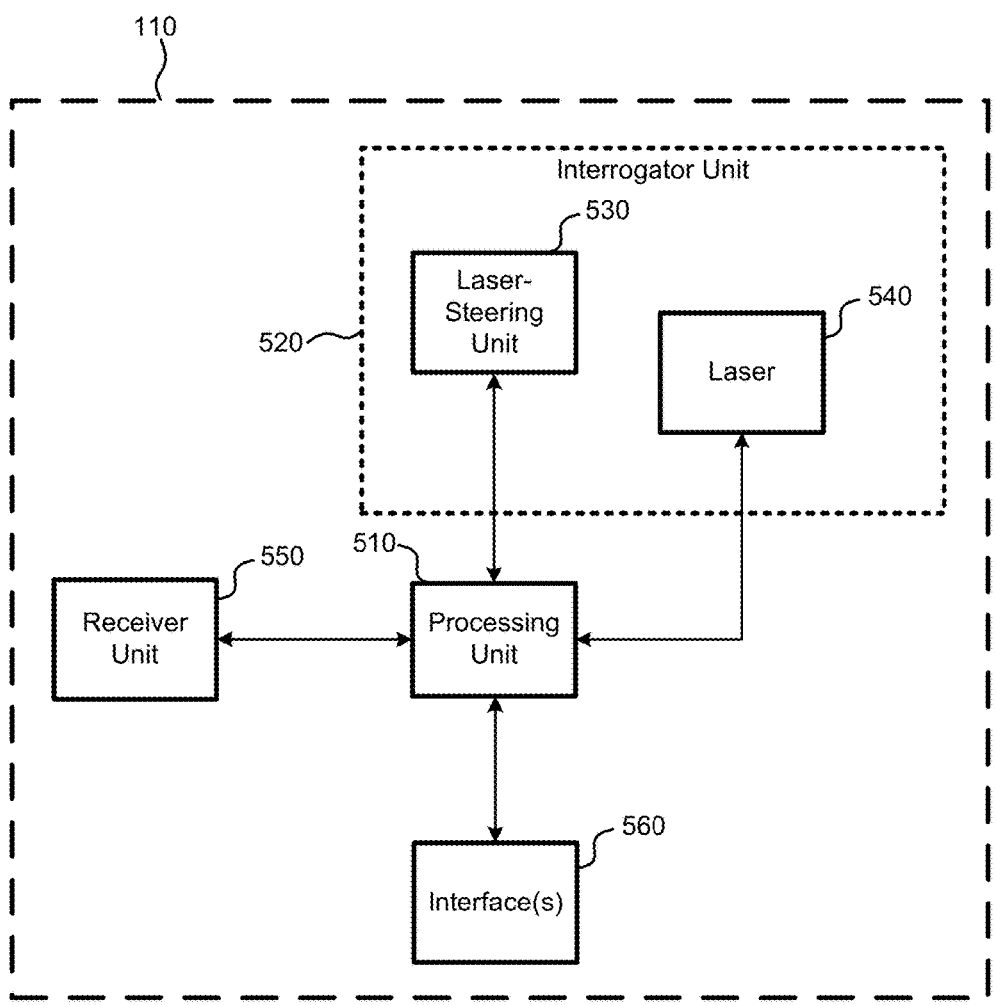
FIG. 5 is a block diagram of various components of an optical device, according to an embodiment.

FIG. 5 is a block diagram of various components of an optical device 110, according to an embodiment. Here, the optical device comprises a processing unit 510, an interrogator unit 520 (comprising a laser-steering unit 530 and a laser 540), a receiver unit 550, and interface(s) 560. It will be understood that, in alternative embodiments, an optical device 110 may include additional components. Moreover, the optical device 110 and/or the components illustrated in FIG. 5 may include optical elements not illustrated, such as lenses, prisms, etc. (It will be understood, for example, that laser-steering unit 530 and laser 540 include optical elements configured to steer and generate a laser beam.) Depending on desired functionality, the optical device may be weapon-mountable, may include other components to provide additional functionality, etc. In some embodiments, for example, the optical device 110 may comprise a weapon-mountable optical scope having optical components enabling a user to look through the optical scope to a target 130 (e.g., as illustrated in FIG. 1), and the coverage area of the scan may be visible through the optical scope and substantially centered at crosshairs that may be overlaid on a visible image of the target 130 viewable through the optical scope. In other embodiments, the optical device 110 may comprise a device separate from an optical scope that may be bore sighted thereto. It will be further understood that additional variations to the embodiment illustrated in FIG. 5 may include combining or separating various components, adding or omitting components, and the like. Depending on desired functionality, embodiments may include an internal power source, such as a battery, and/or utilize an external power source.

In the embodiment illustrated, the processing unit 510 is communicatively coupled to the various other components, as represented by the double arrows in FIG. 5, via a bus, direct connection, or the like. The processing unit 510 may comprise one or more of an application specific integrated circuit (ASIC), a field programmable gate array (FPGA), a general purpose processor, microprocessor, or the like, which may be included in a single physical unit (e.g., a single integrated circuit (IC)) or distributed among various processing elements.

The processing unit 510 is in communication with the interrogator unit 520 to perform the scans described herein by generating and steering laser pulses. Depending on desired functionality, the processing unit 510 may communicate separately with the laser steering unit 530 and laser 540 (as illustrated), or may simply communicate with the interrogator unit 520, which may have its own processing unit.

According to some embodiments, the processing unit 510 may include a memory (e.g. comprising a non-transitory computer-readable medium) that may store and execute computer code, such as software, firmware, and the like. As such, the processing unit 510 may comprise software components that, when executed by hardware elements of the processing unit 510, enable the processing unit 510 to provide the functionality described herein.

The laser 540 may comprise any of a variety of laser types, depending on desired functionality. As previously mentioned, techniques described herein allow for a relatively low-power laser to be used. And thus, the laser 540 may comprise a diode laser. But other laser types, such as a fiber laser, may be used. Here, the laser 540 may comprise optical and electrical components for generating laser pulses as described herein. The optical device may further include accompanying collimating optics to provide the desired wavelength, diffraction, and other optical traits to enable generation of laser pulses as described herein. In some embodiments, an infrared (IR) wavelength may be used to help ensure the laser is not visible to a target 130, during the scan. Nonetheless, visible or other wavelength may be used, depending on desired functionality.

The receiver unit 550 may comprise optical and electronic components configured to receive and decode reflected laser pulses in the manner described herein. As such, the receiver unit 550 may comprise one or more photosensitive elements, such as an avalanche photodiode or a PIN photodiode. The output of these elements may be provided to a processing unit for decoding. This processing unit may comprise the processing unit 510, or a separate processing unit within the receiver unit 550.

The interface(s) 560 of the optical device 110 may comprise one or more of a variety of types of interfaces, depending on desired functionality. For instance, the interface(s) 560 may comprise a user interface configured to receive an input from a user to start a scan. Thus, the interface(s) 560 may comprise a button, switch, touchpad, touchscreen, and/or other input device. The interface(s) 560 may further include an output device, such as an LED, display, etc., enabling the optical device 110 to indicate information to the user (e.g., that a target is a "friend" based on the detected CoD). Additionally or alternatively the interface(s) 560 may comprise an input and/or output interface (including a wireless interface) to another device, enabling the optical device 110 to provide input and/or receipt output to a separate device, in which case the optical device 110 may begin a scan based on input received from the separate device and/or provide the results of the scan to the separate device via the interface(s) 560.

Figure 6:
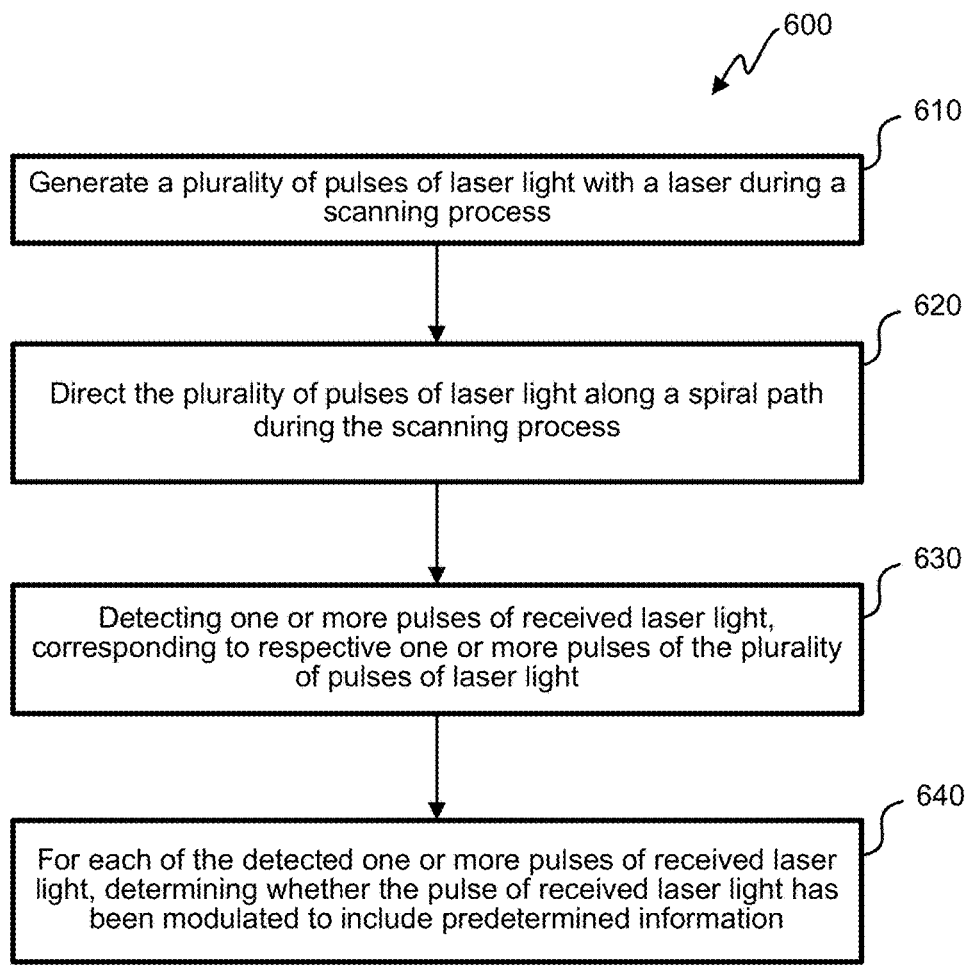
FIG. 6 is a flow diagram, illustrating a method of optical laser communication, according to an embodiment.

FIG. 6 is a flow diagram, illustrating a method of optical laser communication, according to an embodiment. The method 600 can be implemented, for example, by an optical device 110, as described in the embodiments above and illustrated in the appended figures. As such, means for performing one or more of the functions of method 600 may comprise hardware and/or software components of an optical device 110 as illustrated in FIG. 5. As with other figures herein, FIG. 6 is provided as an example. Other embodiments may vary in functionality from the functionality shown. Variations may include performing additional functions, substituting functions, performing functions in a different order or simultaneously, and the like.

The functionality at block 610 comprises generating a plurality of pulses of laser light with a laser during a scanning process. As described herein, such functionality may comprise using a laser diode to generate the plurality of pulses of laser light. Additionally or alternatively, generating the plurality of pulses of laser light may further comprise modulating each pulse of the plurality of pulses of laser light with data. As indicated above, the data may comprise identification and/or other authorization information of the optical device. The data may be included in a communication packet, which may contain a preamble, payload, and one or more CRC codes. In some embodiments, the payload may only be eight or 10 bits, and the entire packet may only be 20-30 bits, the pulse may comprise additional bits, that may be modulated (e.g., amplitude modulated) by a tag in the corresponding response pulse.

To help overcome various negative optical conditions, the data rate may high (e.g., one or more orders of magnitude) relative to the scanning rate, scintillation rate (typically 500 Hz or less), and/or human tremor rate (typically 100 Hz or less). Thus, in some embodiments, the data rate may be at least 1 MHz. in some embodiments, a 1.45 MHz data rate is used.

The plurality of pulses of laser light may be generated over of the period of time. According to some embodiments, the length of time each pulse of the plurality of pulses is generated may be relatively low (e.g., one or more orders of magnitude) relative to the period of time. In some embodiments, the length of time each pulse of the plurality of pulses is generated may be $\frac{1}{1000}$ the length of the period of time or less. For example, in some embodiments, the length of the period of time may be one second or less, and the length of time each pulse of the plurality of pulses is generated may be 100 µs or less.

The way in which the plurality of pulses of laser light are directed may vary, depending on desired functionality. As indicated herein, embodiments may utilize a MEMS mirror to direct the plurality of pulses of laser light, although other embodiments may utilize Risley prisms or other light-steering mechanisms. The size of the coverage area may also vary, depending on factors such as the capabilities of the laser-steering unit, desired speed of the scanning process, type of optical device (e.g., a human-held device vs. a device mounted on a relatively stable platform (not held by human)) and so forth. In some embodiments, for example, directing the plurality of pulses of laser light comprises directing the plurality of pulses of laser light such that a coverage area scanned during the scanning process is at least 5 mrad. According to some embodiments, the coverage area is 6, 7, or 8 mrad, although embodiments may have a larger or smaller coverage area, depending on desired functionality.

The functionality at block 620 comprises directing the plurality of pulses of laser light along a spiral path during the scanning process. As indicated in the embodiments previously described, the spiral path may comprise a scan pattern that traces a spiral shape within a field of view of the optical device. As illustrated in FIG. 2, the pulses of laser light may be generated at certain pulse locations along the spiral path.

As indicated herein, embodiments may employ certain techniques to ensure overscanning of the coverage area. According to some embodiments, for example, generating the plurality of pulses of laser light during the scanning process and directing the plurality of pulses of laser light along a spiral path during the scanning process are such that, within a coverage area scanned during the scanning process, each area illuminated by a respective pulse of the plurality of pulses overlaps with at least one or more other areas illuminated by respective one or more other pulses of the plurality pulses. The amount of overlapping can vary, depending on desired functionality. In some embodiments, an area illuminated by one pulse of the plurality of pulses overlaps with at least 20 other areas illuminated by respective 20 other pulses of the plurality of pulses. Other embodiments may have a greater or smaller amount of overlapping.

At block 630, the functionality comprises detecting one or more pulses of received laser light, corresponding to the respective one or more pulses of the plurality of pulses of laser light. As indicated herein, the one or more pulses of received laser light may corresponds to the pulses of generated laser light that illuminate a tag, which can retro modulate the generated laser light (or generate its own modulated response pulse) with predetermined information. As discussed above, the one or more pulses of received laser light may have varying amplitudes, increasing the likelihood that at least one of the pulses has a suitable amplitude for decoding.

At block 640, the functionality comprises, for each of the detected one or more pulses of received laser light, determining whether the pulse of received laser light has an modulated to include predetermined information. In some instances, for example, the predetermined information may comprise a coat of the day, as discussed above. In other instances, the predetermined information may comprise identification, authentication, or other such information.

As noted herein above, demodulation of the detected one or more pulses of received laser light may comprise dynamically setting a bit threshold. For instance, according to some embodiments, a bit threshold may be set at a midpoint between high and low amplitudes of a received pulse. Once the threshold is established, the optical device can attempt to decode the detected pulse. Additionally, as noted herein, if the predetermined information is detected, then an optical device may discontinue the scan.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Moreover, for many functions described herein, specific means have also been described as being capable of performing such functions. It can be understood, however, that functionality is not limited to the means disclosed. A person of ordinary skill in the art will appreciate that alternative means for performing similar functions may additionally or alternatively be used to those means described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. An optical device comprising:
   a laser;
   a laser-steering unit configured to direct laser light generated by the laser;
   a receiver unit; and
   a processing unit communicatively coupled with the laser, laser-steering unit, and receiver unit, the processing unit configured to:
      cause the optical device to execute a scanning process in which:
         the laser generates a plurality of pulses of laser light, and
         the laser steering unit illuminates a coverage area with the plurality of pulses of laser light by directing the plurality of pulses of laser light such that:
            each pulse of the plurality of pulses of laser light illuminates a respective portion of the coverage area along a spiral scan pattern within the coverage area,
            each portion of the coverage area illuminated by a respective pulse of the plurality of pulses of laser light overlaps with at least one or more other portions of the coverage area illuminated by respective one or more other pulses of the plurality of pulses of laser light,
            the laser steering unit traces the entire spiral scan pattern during the scanning process, and
            the scanning process is completed in less than 1 s; and
      for each of one or more pulses of received laser light detected with the receiver unit corresponding to respective one or more pulses of the plurality of pulses of laser light, determine whether the pulse of received laser light has been modulated to include predetermined information.

2. The optical device of claim 1, wherein the laser, the laser-steering unit, the receiver unit, and the processing unit are at least partially housed in a mountable body configured to be mounted to another apparatus.

3. The optical device of claim 1, wherein the processing unit is configured to cause the optical device to execute the scanning process, wherein a length of time each pulse of the plurality of pulses is generated is 1/1000 the length of the scanning process or less.

4. The optical device of claim 3, wherein the length of time each pulse of the plurality of pulses is generated is 100 µs or less.

5. The optical device of claim 3, wherein the processing unit is configured to cause the laser to modulate each pulse of the plurality of pulses of laser light with data.

6. The optical device of claim 5, wherein the processing unit is configured to cause the laser to modulate each pulse of the plurality of pulses of laser light at a data rate of at least 1 MHz.

7. The optical device of claim 1, wherein the portion of the coverage area illuminated by at least one pulse of the plurality of pulses overlaps with at least 20 other portions of the coverage area illuminated by respective at least 20 other pulses of the plurality of pulses.

8. The optical device of claim 1, wherein the coverage area scanned during the scanning process is at least 5 milliradians (mrad).

9. The optical device of claim 1, wherein the laser-steering unit comprises a microelectromechanical systems (MEMS) mirror.

10. The optical device of claim 1, wherein the laser comprises a laser diode.

11. A method of optical laser communication, the method comprising:
   executing a scanning process in which:
      a plurality of pulses of laser light is generated,
      the plurality of pulses of laser light are directed to illuminate a coverage area with the plurality of pulses of laser light such that:

each pulse of the plurality of pulses of laser light illuminates a respective portion of the coverage area along a spiral & scan pattern within the coverage area, each portion of the coverage area illuminated by a respective pulse of the plurality of pulses of laser light overlaps with at least one or more other portions of the coverage area illuminated by respective one or more other pulses of the plurality of pulses of laser light, the plurality of pulses of laser light are directed to illuminate the coverage area along the entire spiral scan pattern during the scanning process, and the scanning process is completed in less than 1 s;

detecting one or more pulses of received laser light corresponding to respective one or more pulses of the plurality of pulses of laser light; and for each of the detected one or more pulses of received laser light, determining whether the pulse of received laser light has been modulated to include predetermined information.

12. The method of claim 11, wherein:

the plurality of pulses of laser light are generated over of a period of time, and a length of time each pulse of the plurality of pulses is generated is $1/1000$ the length of the period of time or less.

13. The method of claim 12, wherein the length of time each pulse of the plurality of pulses is generated is 100 μs or less.

14. The method of claim 12, wherein generating the plurality of pulses of laser light further comprises modulating each pulse of the plurality of pulses of laser light with data.

15. The method of claim 14, wherein the modulating comprises modulating each pulse of the plurality of pulses of laser light at a data rate of at least 1 MHz.

16. The method of claim 11, wherein the coverage area scanned during the scanning process is at least 5 milliradians (mrad).

17. The method of claim 11, wherein directing the plurality of pulses of laser light comprises using a microelectromechanical systems (MEMS) mirror to direct the plurality of pulses of laser light.

18. The method of claim 11, wherein generating the plurality of pulses of laser light comprises using a laser diode.

* * * * *